US012318809B2

(12) United States Patent
Saenz

(10) Patent No.: US 12,318,809 B2
(45) Date of Patent: Jun. 3, 2025

(54) METHODS AND SYSTEMS FOR MASKING AND RACKING METAL PIPE FITTINGS DURING POWDER COATING

(71) Applicant: Agile Sourcing Partners, Inc., Corona, CA (US)

(72) Inventor: Joe Saenz, San Jacinto, CA (US)

(73) Assignee: Agile Sourcing Partners, LLC, Charlotte, NC (US)

( * ) Notice: Subject to any disclaimer, the term of this patent is extended or adjusted under 35 U.S.C. 154(b) by 0 days.

(21) Appl. No.: 18/437,688

(22) Filed: Feb. 9, 2024

(65) Prior Publication Data

US 2024/0342751 A1 Oct. 17, 2024

Related U.S. Application Data

(60) Continuation of application No. 18/141,644, filed on May 1, 2023, now Pat. No. 11,931,772, which is a division of application No. 17/331,859, filed on May 27, 2021, now Pat. No. 11,679,411.

(51) Int. Cl.

| | |
|---|---|
| ***B05D 1/32*** | (2006.01) |
| ***B05B 12/20*** | (2018.01) |
| ***B05D 1/04*** | (2006.01) |
| ***B05D 7/14*** | (2006.01) |

(52) U.S. Cl.
CPC ................ *B05D 1/32* (2013.01); *B05B 12/20* (2018.02); *B05D 1/04* (2013.01); *B05D 7/146* (2013.01)

(58) Field of Classification Search
CPC ............. B05D 1/32; B05D 1/04; B05D 7/146
See application file for complete search history.

(56) References Cited

U.S. PATENT DOCUMENTS

2006/0185965 A1* 8/2006 Van Kley ............. B65G 37/005 198/785
2012/0112456 A1* 5/2012 Nagareo ............... C08F 290/06 285/390

* cited by examiner

*Primary Examiner* — Hai Y Zhang
(74) *Attorney, Agent, or Firm* — Giordano Law LLC; David A. Giordano

(57) ABSTRACT

Systems and methods for protecting threads of metal pipes while coating the metal pipes with a protective coating are disclosed herein. Innovative metal couplings are used to protect the threads while a protective coating is applied to the metal pipes. The couplings are reusable and result in multiple efficiency improvements over previous methods and systems. Benefits include elimination of plastic caps and reduced waste, improved flowthrough in the powder coating process, more efficient thermo transfer in the thermal chamber, and an increase in the overall capacity of the powder coating operation.

12 Claims, 7 Drawing Sheets

METHODS AND SYSTEMS FOR MASKING AND RACKING METAL PIPE FITTINGS DURING POWDER COATING

FIELD

This application relates to metal pipes and processing metal pipe fittings.

BACKGROUND

Metal pipes of various lengths and diameters are used in numerous applications throughout the world, including plumbing systems, heating systems, electrical systems, oil and gas infrastructure, electrical systems, sprinkler systems, hydraulic systems and many other systems. Metal pipes vary in length and diameter and, often, have male threads at each end. During manufacturing, metal pipes are coated with a protective coating to prevent corrosion. When manufacturing, processing, and preparing metal pipes for use in various applications, including applying the protective coating, the threads at each end of the pipe must be protected. Damage to one thread can render a metal pipe defective or useless.

Protecting threads of metal pipe fittings during manufacturing and processing is labor intensive and expensive. Manufacturers typically protect the threads either by using plastic caps or by applying tape. When using plastic caps, manufacturers purchase disposable plastic caps and then place the caps the threads to protect the threads during processing of the pipes. The plastic caps are a one-time use item. They add to the material costs of the operation and require extra labor to install on the metal pipe fittings. When using tape, manufacturers' employees tape each thread by hand with poly high temperature tape for use in powder coating applications. Taping is slower than using disposable caps because taping requires each thread to be cleaned of lubrication oils prior to application of the tape. Thus, taping adds material costs and labor costs to the processing of the pipes. Because the current options for protecting the threads add material costs and labor-intensive delays, a need exists for a method to cheaply and efficiently protect the threads of metal pipes during manufacturing and processing.

SUMMARY

In one aspect, this disclosure provides a method for applying a protective coating to one or more metal pipes having male threads. The method comprises the steps of: i) providing a plurality of metal pipes having male threads, wherein each metal pipe comprises a first end having a first male thread and a second end having a second male thread, and wherein each metal pipe has at least one inside diameter and at least one outside diameter; ii) providing a plurality of metal couplings, wherein each metal coupling has a first female end, a second female end, and a hollow lumen through the length of the metal coupling, wherein each female end does not have threads and is configured to snugly receive a male thread of a metal pipe; and iii) providing one or more racking rods configured to receive two or more metal pipes and two or more metal couplings, wherein each racking rod has a diameter smaller than the smallest inside diameter of the plurality of metal pipes, and wherein each racking rod has a first end comprising a stop end and a second end comprising a conveyor mechanism.

The method according to this aspect further comprises sliding a first metal coupling longitudinally on a racking rod until the first metal coupling contacts the stop end; sliding a first metal pipe longitudinally on the racking rod until the first thread of the first end of the first metal pipe enters into the first female end of the first metal coupling, thereby resulting in at least a portion of the first thread of the first end of the first metal pipe being contained inside the first female end of the first metal coupling; sliding a second metal coupling longitudinally on the racking rod until a first female end of the second metal coupling slides over at least a portion of the second thread of the second end of the first metal pipe; sliding a second metal pipe longitudinally on the racking rod until the first thread of the first end of the second metal pipe enters into the second female end of the second metal coupling, thereby resulting in at least a portion of the first thread of the first end of the second metal pipe being contained inside the second female end of the second metal coupling; connecting the conveyor mechanism of the racking rod to a conveyor; moving the conveyor into a thermal chamber so the one or more racking rods, the plurality of metal pipes, and the plurality of metal couplings enter the thermal chamber; applying a protective coating to the plurality of metal pipes while the metal pipes are in the thermal chamber; removing the racking rods, the plurality of metal pipes, and the plurality of metal couplings out of the thermal chamber by moving the conveyor; and after the plurality of metal pipes and the plurality of metal couplings have cooled, forcibly separating the plurality of metal pipes and the plurality of metal couplings.

In some embodiments, each female end of the plurality of metal couplings comprises a tapered shape to snugly receive a male thread of a metal pipe. The tapered shape is configured to receive a male thread without damaging the male thread.

In some embodiments of the method, the thermal chamber is heated to a temperature of about 350° F. to about 425° F.

In some embodiments, the method further comprises rinsing the plurality of metal pipes with deionized water after the pipes are moved out of the thermal chamber.

Another aspect of this disclosure is directed to a system for applying a protective coating to one or more metal pipes having male threads. The system comprises a plurality of metal pipes having male threads. Each metal pipe comprises a first end having a first male thread, a second end having a second male thread, and a hollow lumen through the length of the metal pipe. Each metal pipe also has an inside diameter, an outside diameter, and a plurality of metal couplings. Each metal coupling has a first female end, a second female end, and a hollow lumen through the length of the metal coupling. Each female end does not have threads and is configured to snugly receive a male thread of a metal pipe.

The system according to this aspect further includes a racking rod configured to receive a plurality of metal pipes and a plurality of metal couplings. The racking rod has a diameter smaller than the inside diameter of the plurality of metal pipes to be received and the inside diameter of the plurality of metal couplings to be received, wherein the racking rod comprises a first end comprising a stop end and a second end comprising a conveyor mechanism. The first metal coupling is positioned on the racking rod so that the racking rod extends through the lumen of the first metal coupling and a first female of the first metal coupling sits against the stop end of the racking rod. A first metal pipe is positioned on the racking rod so that the racking rod extends through the lumen of the first metal pipe and the first male thread of the first end of the first metal pipe enters into the second female end of the first metal coupling, thereby covering a portion of the first male thread of the first end of the first metal pipe.

A second metal coupling is positioned on the racking rod so that a first female end of the second metal coupling snugly fits over at least a portion of the second thread of the second end of the first metal pipe. A second metal pipe is positioned on the racking rod so that the racking rod extends through the lumen of the first metal pipe and the first male thread of the first end of the second metal pipe enters into a second female end of the second metal coupling, thereby resulting in at least a portion of the first male thread of the first end of the second metal pipe being contained inside the second female end of the second metal coupling.

The system further comprises a conveyor configured to receive and hold the conveyor mechanism of the racking rod and move the racking rod into a thermal chamber. The thermal chamber is configured to heat the racking rod, plurality of metal pipes, and plurality of metal couplings. The system also comprises an applicator for applying a protective coating to the metal pipes in the thermal chamber.

In some embodiments, each female end of the plurality of metal couplings comprises a tapered shape to snugly receive a male thread of a metal pipe. The tapered shape is configured to receive a male thread without damaging the male thread.

In some embodiments, the thermal chamber is heated to a temperature of about 350° F. to about 425° F.

In some embodiments, the applicator comprises an electrostatic spray coating system.

DETAILED DESCRIPTION

Figure 1:
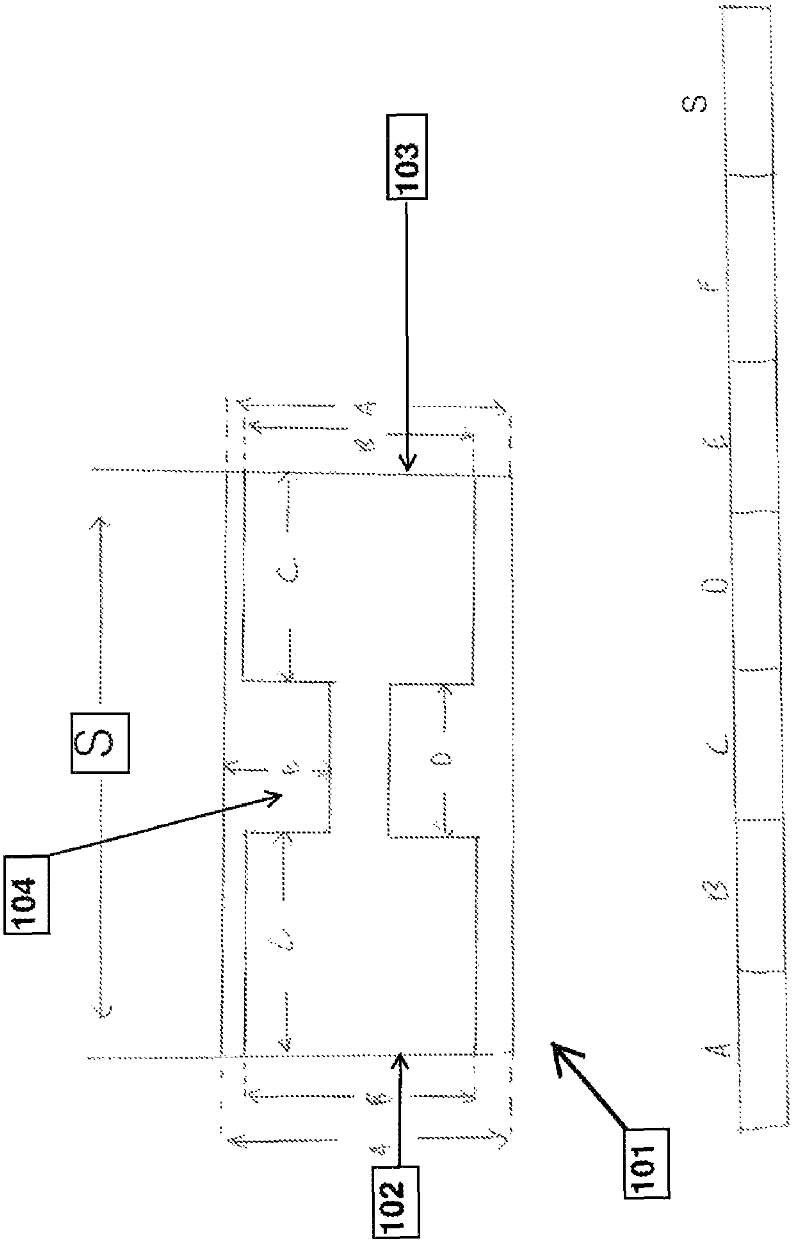
FIG. 1 is an illustration of a coupling of this disclosure.

This disclosure provides new systems and methods for applying protective coatings to metal pipes while protecting the threads of the pipes. In the systems and methods of this disclosure, new and reusable metal couplings are used to protect the threads during application of a protective coating to the metal pipes. The systems and methods described herein provide multiple improvements in efficiencies. For one, instead of purchasing and using disposable plastic caps or tape to protect male threads of metal pipes, the systems and methods disclosed herein use reusable metal couplings. The reusable metal couplings save money and eliminate wasted material from used plastic caps and tape. Lower labor costs are another efficiency improvement obtained by the systems and methods disclosed herein. Instead of applying a single cap to each male pipe thread, or having to tape each male pipe thread, reusable metal couplings can protect the threads of two different pieces of pipe. The systems and methods disclosed herein allow for a greater number of metal pipes to be protected and coated in a shorter amount of time. Finally, thermal energy is conserved for similar reasons. The reusable couplings protect multiple threads of metal pipes, allowing metal pipes to be processed more closely together, and to enter the thermal coating chamber more closely together. This reduces loss of thermal energy which previously occurred due to the spacing between metal pipes with plastic caps or taped ends entering the thermal coating chamber.

One aspect of this disclosure provides a method for applying a protective coating to one or more metal pipes having male threads. In the method, a plurality of metal pipes having male threads are provided. Each metal pipe comprises a first end having a first male thread and a second end having a second male thread. Each metal pipe also has at least one inside diameter and at least one outside diameter. Generally, the difference between the inside diameter and the outside diameter is the thickness of the wall of the metal pipe. In some embodiments, a metal pipe has a first inside diameter and a first outside diameter at a first end and a second inside diameter and second outside diameter at a second end. In some embodiments, the first inside diameter is different from the second inside diameter and the second outside diameter is different from second outside diameter. In some embodiments, the metal pipe has one inside diameter and one outside diameter. As used herein, sometimes a metal pipe is also referred to as a metal fitting or a nipple.

The method also comprises providing a plurality of metal couplings. Each metal coupling has a first female end, a second female end, and a hollow lumen through the length of the metal coupling. Each female end does not have threads. Instead, the female end is configured to snugly receive a male thread of a metal pipe. The plurality of metal couplings are tapered to a diameter that allows each coupling to receive the male thread of a metal pipe without damaging the thread. The taper cannot be too tight otherwise the coupling could damage the male threads that the coupling is designed to protect during the process. In some embodiments, the coupling is a tapered slip coupling.

Each female end has at least one inside diameter and at least one outside diameter. In some embodiments, the inside diameters and outside diameters of each female end are the same. In some embodiments, the inside diameter and outside diameter of one female end of a metal coupling are different from the inside diameter and outside diameter of the other end of the metal coupling. For example, a reducing coupling can have different inside and outside diameters on its ends.

The method also comprises providing one or more racking rods configured to receive two or more metal pipes and two or more metal couplings. When used in the method, a racking rod has a diameter smaller than the smallest inside diameter of the plurality of metal pipes and the smallest inside diameter of the plurality of metal couplings. This allows the racking rod to be able to slide through the metal pipe. In some embodiments, the racking rod has a first end comprising a stop end. The stop end is a shape welded on, or otherwise attached to, the end of the rod so that pipes or couplings that slide onto the racking rod stop at the stop end and do not slide off. In some embodiments, the stop end comprises a T shape or an L shape. In other embodiments, the stop end comprises a sphere or ball large enough to prevent a metal pipe or coupling from sliding off the racking rod. In some embodiments, the racking rod comprises a second end comprising a conveyor mechanism. The conveyor mechanism is configured to allow the racking rod to be connected to a conveyor. The conveyor is configured to hold and move the racking rods. In some embodiments, the conveyor mechanism allows the racking rod to be hung from a conveyor. In some embodiments, the conveyor mechanism comprises a hook. In some embodiments, the conveyor mechanism comprises a T shape or an L shape. In some embodiments, the conveyor is a chain or another mechanism configured to suspend a racking rod via the conveyor mechanism.

In certain embodiments, the racking rod extends vertically from a conveyor instead of being hung from a conveyor using a conveyor mechanism. In some embodiments, the racking rod is mounted on a conveyor track, where the track is configured to move the racking rods into the thermal chamber for application of the protective coating. In some embodiments, the conveyor comprises a track which hooks on a wire loop from top of the rod, and also, hooks on the conveyor.

The method also comprises sliding a first metal coupling longitudinally over the length of a racking rod until the first metal coupling contacts the stop end. Once the first metal coupling contacts the stop end, it rests against the stop end. If the racking rod is held vertically, or somewhat vertically, i.e., at an angle, then gravity will aid in holding the first metal coupling against the stop end. In some embodiments, the racking rod is positioned at an angle, e.g., 20°, 30°, 45°, 60°, 75°, or an angle ranging between 1°-90°. In some embodiments, the racking rod is positioned vertically, and in other embodiments, the racking rod is positioned horizontally. In certain embodiments, the racking rod is not at a fixed angle, but moves between horizontal and vertical positions to allow an operator to manipulate the rack while placing metal couplings and metal pipes onto it.

The method also comprises sliding a first metal pipe longitudinally on the racking rod until the first thread, or at least a portion of the first thread, of the first end of the first metal pipe enters into the first female end of the first metal coupling. After the first thread of the first end of the first metal pipe enters into the female end of the metal coupling, the first thread, or at least a portion of the first thread, of the first end of the first metal pipe is contained inside the first female end of the first metal coupling. This allows the reusable metal coupling to cover the male thread and protect it during the application of the protective coating.

The method also comprises sliding a second metal coupling longitudinally on the racking rod until a first female end of the second metal coupling slides over at least a portion of the second thread of the second end of the first metal pipe. After the first female end of the second metal coupling slides over at least a portion of the second thread of the second end of the first metal pipe, the second thread, or at least a portion of the second thread, is contained inside the second female coupling. This allows the second reusable metal coupling to cover the second male thread of the second end of the first metal pipe and protect it during the application of the protective coating.

After the pipes are racked, the pipes are hung on the conveyor line, rinsed with deionized water, then moved into a thermal chamber. As used herein, thermal chamber is also referred to as an oven. In some embodiments, the thermal chamber has dimensions of approximately 20' long by 6' wide by 8' tall. The temperature setting of the thermal chamber depends on the thickness of the pipes, but generally ranges between about 350° F. to about 450° F. degrees. Once the pipes are heated, the pipes are removed from the thermal chamber, rinsed with deionized water, and placed into powder coating booth which applies a spray powder coating. The pipes are then removed from the powder coating booth and placed back into thermal chamber to bake the powder onto the pipe.

The method also comprises sliding a second metal pipe longitudinally on the racking rod until the first thread, or a portion of the first thread, of the first end of the second metal pipe enters into the second female end of the second metal coupling. After the first thread of the first end of the second metal pipe enters into the second female end of the second metal coupling, at least a portion of the first thread of the first end of the second metal pipe is contained inside the second metal coupling.

In some embodiments, the method also comprises connecting the conveyor mechanism of the racking rod to a conveyor. Once connected, the racking rod is suspended from the conveyor. In other embodiments, the racking rod is connected to a conveyor track instead of being suspended from a conveyor. In such embodiments, the racking rod extends vertically or at an angle from the track.

In some embodiments, the method also comprises moving the conveyor into a thermal chamber so the plurality of metal pipes and the plurality of metal couplings on the one or more racking rods enter the thermal chamber. The thermal chamber as used herein can also be referred to as an oven. In certain embodiments, the thermal chamber is heated to a temperature ranging from about 350° F. to about 450° F. In certain embodiments, the thermal chamber is heated to a temperature ranging from about 350° F. to about 425° F. In some embodiments, the method comprises applying a protective coating to the plurality of metal pipes while the metal pipes are in the thermal chamber. In some embodiments, the method comprises applying a protective coating to the plurality of metal pipes after the metal pipes exit the thermal oven. In some embodiments, the method comprises moving the plurality of metal pipes into the thermal chamber, heating the plurality of metal pipes to an appropriate temperature, moving the plurality of metal pipes out of the thermal chamber, applying a protective coating to the plurality of metal pipes, and then moving the plurality of metal pipes back into the thermal chamber. In certain embodiments, the protective coating is applied by an electrostatic spray coating a powder onto the metal pipes. In other embodiments, the protective coating is applied by a powder bath, wherein a powder bath comprises one of the following or a combination of the following: dipping the plurality of metal pipes into a bath of powder; rolling the pipes into the powder; and blasting the plurality of metal pipes with air so the powder swirls around and coats the pipes.

After the protective coating is applied, in some embodiments, the method comprises moving the conveyor out of the thermal chamber. Moving the conveyor out of the thermal chamber moves the racking rods, the plurality of metal pipes, and the plurality of metal couplings out of the thermal chamber. After the plurality of metal pipes and the plurality of metal couplings have cooled, the plurality of metal pipes are separated from the plurality of metal couplings. For example, as soon as the plurality of metal pipes exits the oven, the begin cooling. In some embodiments, the protective powder cures around about 180° F. In some instances, the metal pipes and metal couplings will be slightly stuck together after heating, application of the protective coating, and cooling. In some instances, the metal pipes and metal couplings are forcibly separated, e.g., by using a metal pole, rubber mallet, or other similar instrument that does not damages the pipes or couplings.

Another aspect of this disclosure provides a system for applying a protective coating to one or more metal pipes having male threads. The system comprises a plurality of metal pipes having male threads. Each metal pipe comprises a first end having a first male thread, a second end having a second male thread, and a hollow lumen through the length of the metal pipe. Each metal pipe has an inside diameter and an outside diameter. In some embodiments, a metal pipe has a first inside diameter and a first outside diameter at first end and a second inside diameter and a second outside diameter at a second end. In some embodiments the first inside diameter is different from the second inside diameter and the first outside diameter is different from the second outside diameter. In some embodiments, a metal pipe has one inside diameter and one outside diameter.

The system also comprises a plurality of metal couplings, wherein each metal coupling has a first female end, a second female end, and a hollow lumen through the length of the metal coupling. Each female end does not have threads. Instead, the female end is configured to have a diameter that snugly receives a male thread of a metal pipe while not damaging the first male thread of the metal pipe. Each female end can be tapered to receive the male thread. However, the taper cannot be such that it will damage the male thread. In some embodiments, the metal couplings are tapered slip couplings. Each female end has at least one inside diameter and at least one outside diameter. In some embodiments, the inside diameters and outside diameters of each female end are the same. In some embodiments, the female end has a tapered design which matches the type of thread being masked. In some embodiments, the inside diameter and outside diameter of one female end of a metal coupling are different from the inside diameter and outside diameter of the other end of the metal coupling. For example, a reducing coupling can have different inside and outside diameters on its ends.

The system also comprises one or more racking rods (also referred to herein as “racks”) configured to receive two or more metal pipes and two or more metal couplings. Each racking rod has a smaller diameter than the smallest inside diameter of the plurality of metal pipes to be received. The diameter of the racking rod is also smaller than the inside diameter of the metal coupling to be received. The smaller diameter of the racking rod allows the racking rod to be able to slide through the metal pipe. In some embodiments, the racking rod has a first end comprising a stop end. The stop end is a shape welded or, or otherwise connected to, to the end of the rod so that pipes that slide onto the racking rod stop at the stop end and do not slide right off. In some embodiments, the stop end comprises a T shape or an L shape. In other embodiments, the stop end comprises a sphere or ball large enough to prevent a metal pipe or coupling from sliding off the racking rod. In some embodiments, the racking rod also comprises a second end comprising a conveyor mechanism. The conveyor mechanism is configured to allow the racking rod to be connected to a conveyor. In some embodiments, the conveyor mechanism allows the racking rod to be hung from a conveyor. In some embodiments, the conveyor mechanism comprises a hook. In some embodiments, the conveyor mechanism comprises a T shape or an L shape. In some embodiments, the conveyor is a chain or another mechanism configured to suspend a racking rod via the conveyor mechanism. In certain embodiments, the racking rod extends vertically from a conveyor instead of being hung from a conveyor using a conveyor mechanism. In some embodiments, the racking rod is mounted on a conveyor track.

In some embodiments of the system, a first metal coupling is positioned on the racking rod so that the racking rod extends through the lumen of the first metal coupling and a first female of the first metal coupling sits against the stop end of the racking rod. In some embodiments of the system, a first metal pipe is positioned on the racking rod so that the racking rod extends through the lumen of the first metal pipe and the first male thread, or a portion of the first male thread, of the first end of the first metal pipe enters into the second female end of the first metal coupling, thereby covering at least a portion of the first male thread of the first end of the first metal pipe.

In some embodiments of the system, a second metal coupling is positioned on the racking rod so that a first female end of the second metal coupling snugly fits over the second thread, or at least a portion of the second thread, of the second end of the first metal pipe. By doing so, the second metal coupling covers and protects the second thread, or at least a portion of the second thread, of the second end of the first metal pipe.

In some embodiments of the system, a second metal pipe is positioned on the racking rod so that the racking rod extends through the lumen of the second metal pipe and the first male thread, or a portion of the first male thread, of the first end of the second metal pipe enters into a second female end of the second metal coupling, thereby resulting in at least a portion of the first male thread of the first end of the second metal pipe being contained inside the second female end of the second metal coupling.

In some embodiments of the system, the racking rod slides through as many metal couplings and metal pipes as can be contained on the length of the racking rod. In some embodiments, the racking rod slides through a first metal coupling, a first metal pipe, a second metal coupling, and second metal pipe, and a third metal coupling. The material, diameter, and tensile strength will inform a person of skill in the art how many metal couplings and metal pipes a certain racking rod can hold. A person of skill in the art will consider whether a material is brittle or ductile when selecting a material for a racking rod.

In some embodiments, the system comprises a conveyor configured to receive and hold the conveyor mechanism of the racking rod and move the racking rod into a thermal chamber. In such embodiments, the conveyor suspends the racking rod vertically for conveyance into the thermal chamber. In some embodiments, the conveyor is a chain or cable or wire or similar structure. In other embodiments, racking rods are in an upright position, or at an angle, and anchored on a conveyor, which may be a track. In such embodiments, the track moves the racking rods into the thermal chamber.

In some embodiments, the system also comprises a thermal chamber configured to heat the racking rod, plurality of metal pipes, and plurality of metal couplings to a temperature ranging from about 350° F. to about 450° F. In some embodiments, the temperature ranges from about 350° F. to about 425° F.

In some embodiments, the system comprises an applicator for applying a protective coating to the metal pipes in the thermal chamber. In certain embodiment, the applicator applies the protective coating by spray coating a powder onto the metal pipes. In other embodiments, the applicator applies the protective coating to the plurality of metal pipes while the metal pipes are in the thermal chamber. In other embodiments, the applicator applies the protective coating to the plurality of metal pipes after the metal pipes exit the thermal chamber. In certain embodiment, the applicator applies the protective coating by an electrostatic spray coating a powder onto the metal pipes. In other embodiments, the applicator applies the protective coating by a powder bath, wherein a powder bath comprises one of the following or a combination of the following: dipping the plurality of metal pipes into a bath of powder; rolling the pipes into the powder; and blasting the plurality of metal pipes with air so the powder swirls around and coats the pipes.

In some embodiments, the reusable metal coupling comprises steel. In other embodiments, the reusable metal couplings comprise brass, aluminum, iron, stainless steel, or combinations thereof. It has been discovered that steel performed better than the other metals when the metal pipes being coated and the metal couplings being used also comprise steel. Although not bound by theory, it is believed that using a metal coupling comprising the same metal as the metal pipe being coated and protected allows the metal coupling and metal pipe to expand and contract at the same rate when being heated and cooled. When employing reusable couplings of different metals to protect the threads of steel pipe, it was discovered that the other metals were too soft and heated and cooled at different rates than the steel pipes, resulting in inconsistent thickness of the protective coating.

The reusable metal couplings disclosed herein are designed to slide over the ends of the pipe fittings to protect the threads, not to thread onto the male threads of pipes. As noted, the metal couplings comprise a taper to slide over the male threads but not to damage those threads. The taper must be carefully crafted to avoid damage to the male threads. This helps ensure that the powder coating is only applied as required to the pipe nipple itself and does not pass the coupling. Extensive research and development was required to figure out which metals would hold up to the intense heating and cooling in the coating process and, in certain embodiments, the hammering of the coupling to remove the coupling from the pipe fittings after coating is applied. In some embodiments of the systems and methods disclosed herein, the metal couplings and racking rods comprise steel. It has been discovered that steel generally held up the best during the process and had the best conductivity for the powder coating.

To accommodate for the various diameters of pipe fittings, racking rods have rods with different diameters. With the different rod diameters, the methods and systems disclosed herein successfully process ¼" to 4" diameter fittings (diameters given in Nominal Pipe Size). In some embodiments, the racks are designed to hang vertically from the conveyor chain on the powder coating line. By hanging the racks vertically, spacing between each rack is conserved, thereby utilizing more of the conveyor chain. This enables more racks to be processed in the thermal chamber at the same time. Previous racking had to be spaced with a 3-foot gap between racks because pipes were typically hung on wide stands, which left dead space between the racks and utilized energy inefficiently. In some embodiments, the racks are hung 6"-8" apart.

Referring now to FIG. 1, coupling 101 is an embodiment of a metal coupling disclosed herein. Coupling 101 has length S. A refers to the outside diameter of coupling 101. B refers to the inside diameter of female ends 102 and 103. C refers to the depth for female ends 102 and 103, i.e., how far a pipe can be inserted into female ends 102 and 103. E refers to the thickness of internal stop 104 of coupling 101 and D refers to the length of internal stop 104. F refers to the inside diameter of the space through the internal stop, which allows for fluid flow.

Table 1 provides exemplary dimensions in inches of the features of the embodiment of a coupling in FIG. 1

TABLE 1

| Coupling Dimensions Size | | | | | | |
|---|---|---|---|---|---|---|
| A | B | C | D | E | F | G |
| | | | ½" | | | |
| 1.075 | 0.840 | 0.475 | 0.300 | 0.225 | 0.575 | 1.250 |
| | | | ¾" | | | |
| 1.295 | 1.050 | 0.475 | 0.300 | 0.225 | 0.750 | 1.250 |
| | | | 1" | | | |
| 1.610 | 1.310 | 0.475 | 0.300 | 0.300 | 0.975 | 1.250 |
| | | | 1¼" | | | |
| 1.965 | 1.660 | 0.475 | 0.300 | 0.300 | 1.275 | 1.250 |
| | | | 1½" | | | |
| 2.225 | 1.900 | 0.525 | 0.300 | 0.300 | 1.625 | 1.350 |
| | | | 2" | | | |
| 2.715 | 2.375 | 0.525 | 0.300 | 0.300 | 2.115 | 1.350 |

Figure 2A:
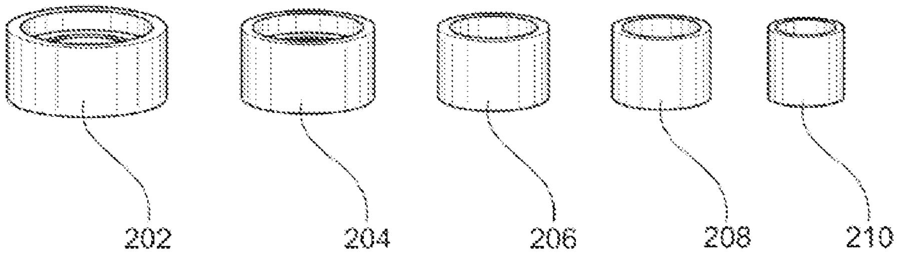
FIG. 2A is an illustration of couplings of various sizes.
Figure 2B:
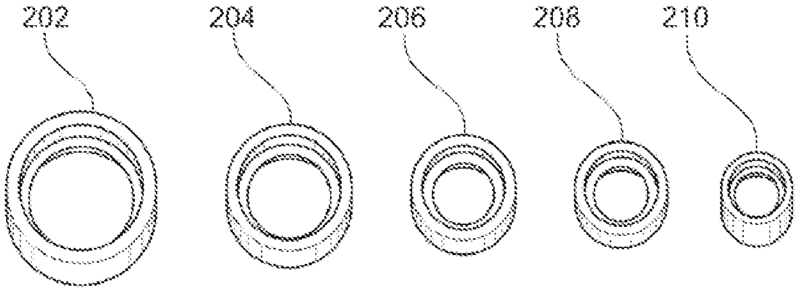
FIG. 2B is a top-down view illustration of couplings of various sizes.

Referring to FIG. 2A, couplings 202, 204, 206, 208, and 210 are shown from a side view having various sizes. FIG. 2B shows the same couplings from a top-down or plan view.

Figure 3:
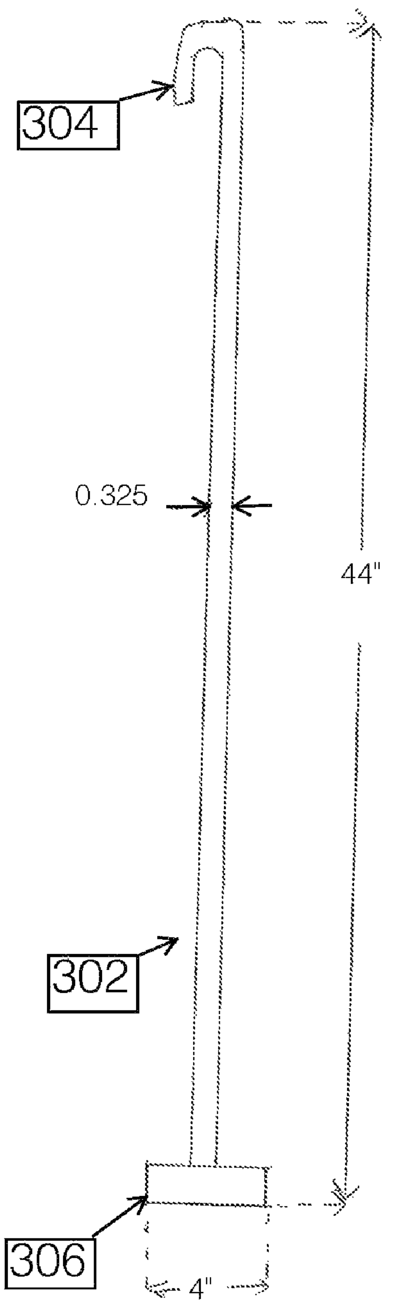
FIG. 3 is an illustration of an embodiment of a rack of this disclosure.

FIG. 3 shows an embodiment of racking rod 302 comprising hook end 304 and bar end 306. Hook end 304 allows the racking rod to connect to the conveyor.

Figure 4:
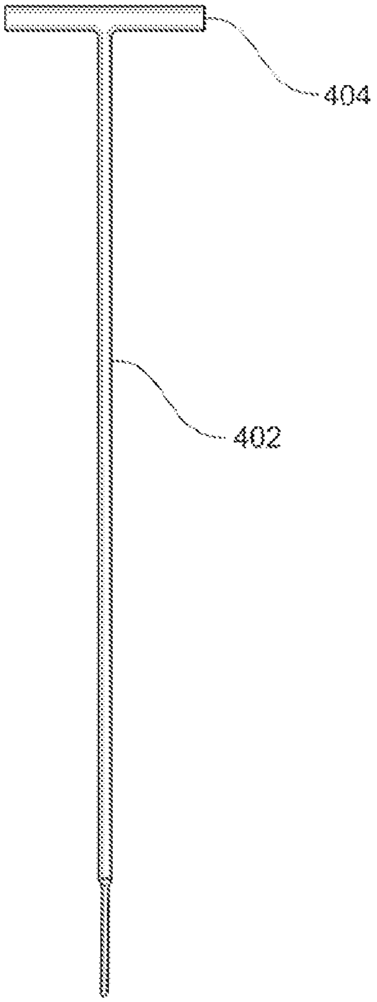
FIG. 4 is an illustration of an embodiment of a rack of this disclosure.

FIG. 4 shows an embodiment of racking rod 402 comprising stop end 404. Stop end 404 has a T shape.

Figure 5:
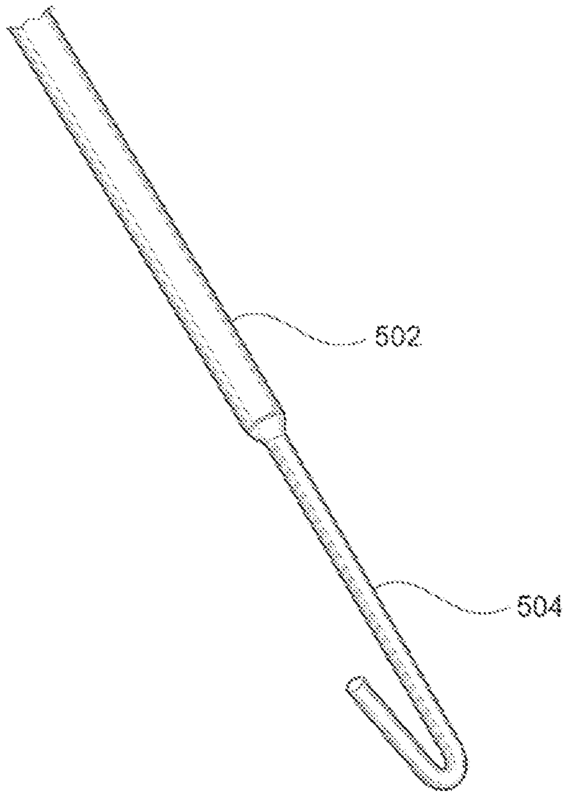
FIG. 5 is a partial view of a rack showing a conveyor mechanism.

FIG. 5 shows an embodiment racking rod 502 comprising another embodiment of hook end 504.

Figure 6:
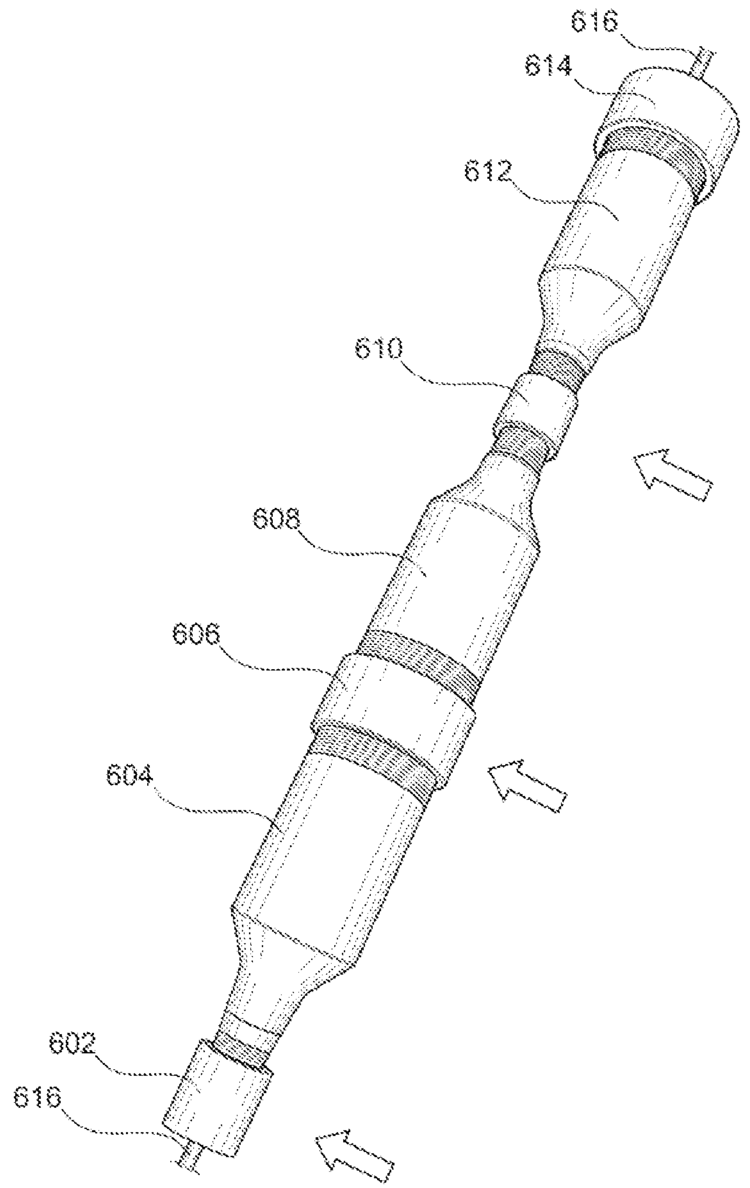
FIG. 6 shows metal couplings and metal fittings assembled on a rack prior to processing.

FIG. 6 shows metal coupling 602 connected to metal fitting 604 connected to metal coupling 606 connected to metal fitting 608 connected to metal coupling 610 connected to metal fitting 612 connected to metal coupling 614. As shown in FIG. 6, metal couplings 602, 606, 610, and 614 cover a portion of the male threads of metal fittings 604, 608, and 612. Racking rod 616 extends through the lumens of each metal coupling and metal fitting.

Figure 7:
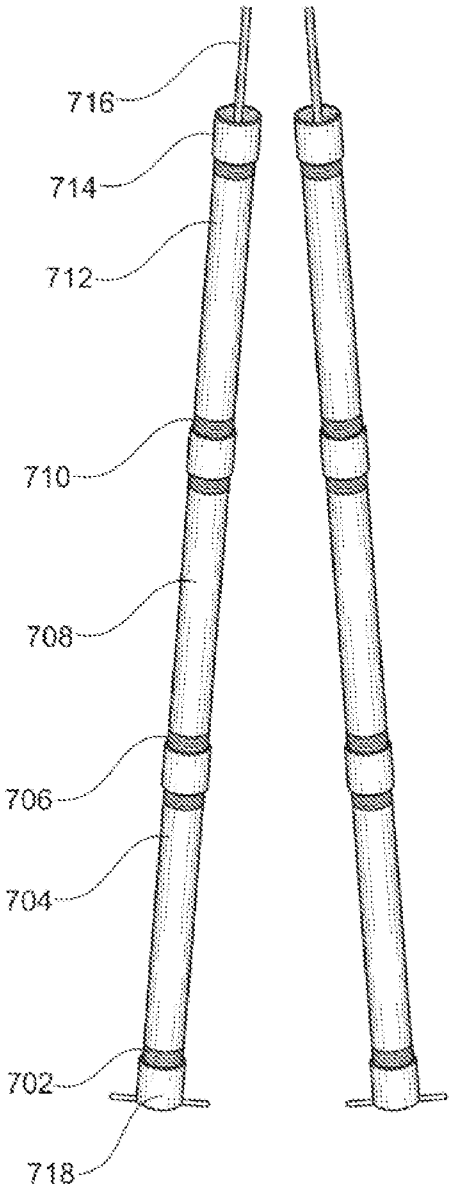
FIG. 7 shows metal couplings and metal fittings assembled on a rack after processing.

FIG. 7 shows metal coupling 702 connected to metal fitting 704 connected to metal coupling 706 connected to metal fitting 708 connected to metal coupling 710 connected to metal fitting 712 connected to metal coupling 714. Racking rod 716 extends through each metal fitting and metal coupling. Racking rod 716 comprises stop end 718 having a T-shape.

Overall, the methods and systems disclosed herein achieve numerous improvements in efficiencies and yield, including yield improved flowthrough in the powder coating process, more efficient thermo transfer in the thermal chamber, and an increase in the overall capacity of the powder coating operation. Minimized air space between the racks allows the temperature of the fittings coming out of the thermal chamber to be consistent. This improves quality of the power coating process by improving the adhesion properties.

EXAMPLES

Example 1

For application of this racking/masking solution, the operator places the bin of the desired coupling size in their workstation. The racks are set at 30 degree angles on the masking table 2 racks at a time. The operator then places one coupling on the rack then a pipe fitting on the rack, then coupling, then a pipe fitting. This is repeated until the rack is full (6" from top of rack). Completed racks are placed into racking pallet to be taken to the coating line. Once at the powder coating line the racks are hung vertically. Upon powder coating, the fittings on the racks are removed. Removing the fittings is accomplished by placing the racks on a flat surface and striking the couplings with a steel pole. This breaks the thin layer of powder coat between the coupling and fitting. The operator removes the racks by pulling from the bottom to separate the coupling from the power coated fittings.

The invention claimed is:

1. A method for applying a protective coating to a plurality of metal pipes having male threads, comprising:

providing a plurality of metal pipes having male threads, wherein each metal pipe comprises a first end having a first male thread and a second end having a second male thread;

providing a plurality of metal couplings, wherein each metal coupling has a first female end, a second female end, and a hollow lumen through the length of the metal coupling, wherein each female end does not have threads and is configured to snugly receive a male thread of a metal pipe;

providing a racking rod configured to receive two or more metal pipes and two or more metal couplings, wherein the racking rod has a first end comprising a stop end and a second end comprising a conveyor mechanism, wherein the racking rod is operably connected to a conveyor via the conveyor mechanism;

sliding a first metal coupling longitudinally on the racking rod until the first metal coupling contacts the stop end;

sliding a first metal pipe longitudinally on the racking rod until at least a portion of the first thread of the first end of the first metal pipe enters into the first female end of the first metal coupling;

sliding a second metal coupling longitudinally on the racking rod until a first female end of the second metal coupling slides over at least a portion of the second thread of the second end of the first metal pipe;

sliding a second metal pipe longitudinally on the racking rod until at least a portion of the first thread of the first end of the second metal pipe enters into the second female end of the second metal coupling;

moving the conveyor so the racking rod, the plurality of metal pipes, and the plurality of metal couplings enter into a thermal chamber;

heating the thermal chamber while the racking rod, the plurality of metal pipes, and the plurality of metal couplings are in the thermal chamber;

moving the conveyer to move the racking rod out of the thermal chamber; and applying a protective coating to the plurality of metal pipes.

2. The method of claim 1, wherein the thermal chamber is heated to a temperature of about 350° F. to about 425° F.

3. The method of claim 1, further comprising rinsing the plurality of metal pipes with deionized water after the pipes are moved out of the thermal chamber.

4. The method of claim 1, wherein each female end of the plurality of metal couplings comprises a tapered shape to snugly receive a male thread of a metal pipe.

5. The method of claim 1, wherein the stop end has a T shape or an L shape or a sphere shape.

6. The method of claim 1, wherein the conveyor comprises a track and wherein the racking rod hangs vertically from the track.

7. The method of claim 1, further comprising moving the conveyor to move the racking rod back into the thermal chamber after application of the protective coating.

8. The method of claim 1, further comprising forcibly separating the plurality of metal pipes and the plurality of metal couplings.

9. The method of claim 1, wherein the protective coating is applied by an electrostatic spray.

10. The method of claim 1, wherein the protective coating is applied by a powder bath.

11. The method of claim 1, wherein the plurality of metal pipes and the plurality of metal couplings comprise the same metal.

12. The method of claim 1, wherein the racking rod is set at angle prior to sliding a metal coupling or metal pipe on the rack.

* * * * *